(12) United States Patent
Kidney

(10) Patent No.: US 11,662,912 B2
(45) Date of Patent: May 30, 2023

(54) SWITCHLESS NVME FABRIC

(71) Applicant: Patrick Kidney, New York, NY (US)

(72) Inventor: Patrick Kidney, New York, NY (US)

( * ) Notice: Subject to any disclaimer, the term of this patent is extended or adjusted under 35 U.S.C. 154(b) by 0 days.

(21) Appl. No.: 17/391,996

(22) Filed: Aug. 2, 2021

(65) Prior Publication Data

US 2022/0019353 A1     Jan. 20, 2022

Related U.S. Application Data

(60) Provisional application No. 63/067,564, filed on Aug. 19, 2020.

(51) Int. Cl.
     *G06F 3/06*      (2006.01)

(52) U.S. Cl.
     CPC .......... *G06F 3/0613* (2013.01); *G06F 3/0604* (2013.01); *G06F 3/067* (2013.01); *G06F 3/0659* (2013.01); *G06F 3/0688* (2013.01)

(58) Field of Classification Search
     CPC ...... G06F 3/0613; G06F 3/067; G06F 3/0688; G06F 3/0689; G06F 3/0683; G06F 3/0679; G06F 3/0604
     USPC .................................................. 711/103, 154
     See application file for complete search history.

(56) References Cited

U.S. PATENT DOCUMENTS

| | | | | |
|---|---|---|---|---|
| 9,910,753 | B1* | 3/2018 | Tringale | G06F 3/0635 |
| 2017/0302526 | A1* | 10/2017 | Chen | H04L 67/14 |
| 2017/0302573 | A1* | 10/2017 | Chen | H04L 45/74 |
| 2019/0235773 | A1* | 8/2019 | Schmisseur | G06F 3/0622 |
| 2020/0133898 | A1* | 4/2020 | Therene | G06N 3/0454 |

\* cited by examiner

*Primary Examiner* — Than Nguyen
(74) *Attorney, Agent, or Firm* — Barry Choobin; Patent 360

(57) ABSTRACT

A method for connecting a plurality of NVMe storage arrays using switchless NVMe cross connect fiber channel architecture for faster direct connectivity and reduced latencies.

3 Claims, 3 Drawing Sheets

SWITCHLESS NVME FABRIC

CROSS-REFERENCE TO RELATED APPLICATIONS

This application claims priority from the U.S. provisional patent application Ser. No. 63/060,099, filed on Aug. 2, 2020, and U.S. provisional patent application Ser. No. 63/067,564, filed on Aug. 19, 2020, both are incorporated herein by reference in its entirety

FIELD OF INVENTION

The present invention relates to network storage technology, and more particularly, the present invention relates to switchless NVMe fabric for the container storage architecture.

BACKGROUND

Non-Volatile Memory Express over fabrics, abbreviated as NVMe over fabrics, NVMe-of, or simply NVMeOF, has become a new era in storage network technology. NVMe-of is an extension of the NVMe network protocol to Ethernet and Fiber Channel delivering faster and more efficient connectivity between storage and servers. NVMe-of is common architecture that supports NVMe protocol over a wide range of storage network topologies, such as Ethernet, Fiber channel, InfiniBand, and other like fabrics. The term fabric connotes the network topology in which network nodes can pass data to each other through a variety of interconnecting protocols, ports, and switches.

The known NVME-of technology suffers from two major drawbacks. One is the network bottleneck and the second is cost. At present, the storage is faster than the network.

Thus, an industry need is there for a solution that can over overcome the aforesaid drawbacks and provide improved latencies in storage networks.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprise", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Figure 1:
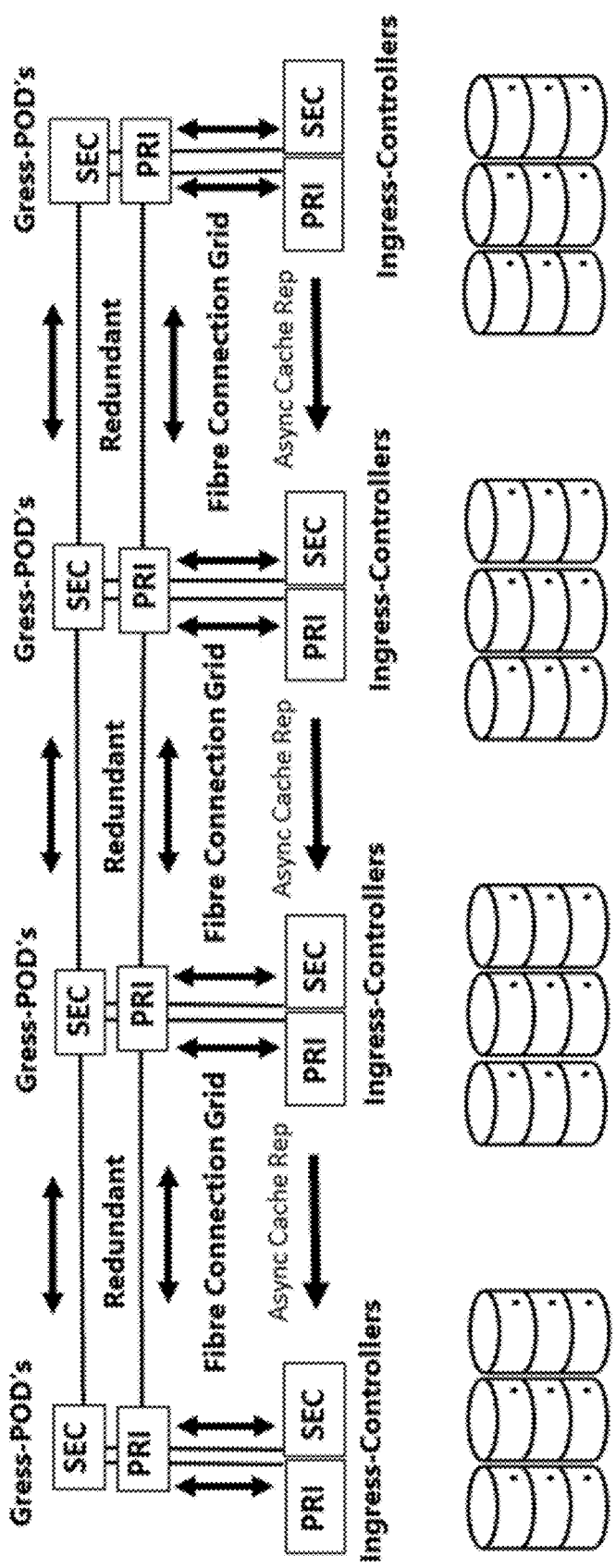
FIG. 1 is a block diagram showing switchless cross connect architecture connecting NVMe storage nodes through fiber channel connection grid, according to an exemplary embodiment of the present invention.
Figure 2:
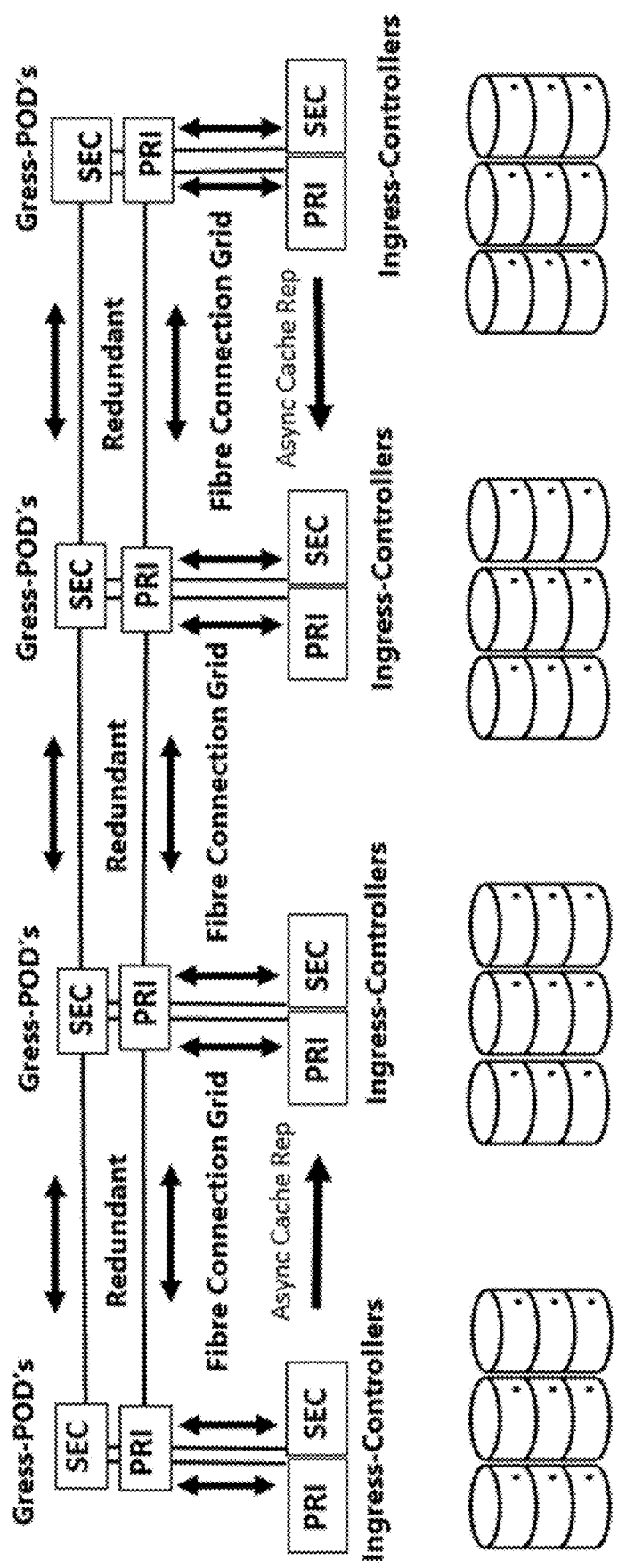
FIG. 2 is a block diagram showing another exemplary embodiment of the storage architecture, according to an exemplary embodiment of the present invention.
Figure 3:
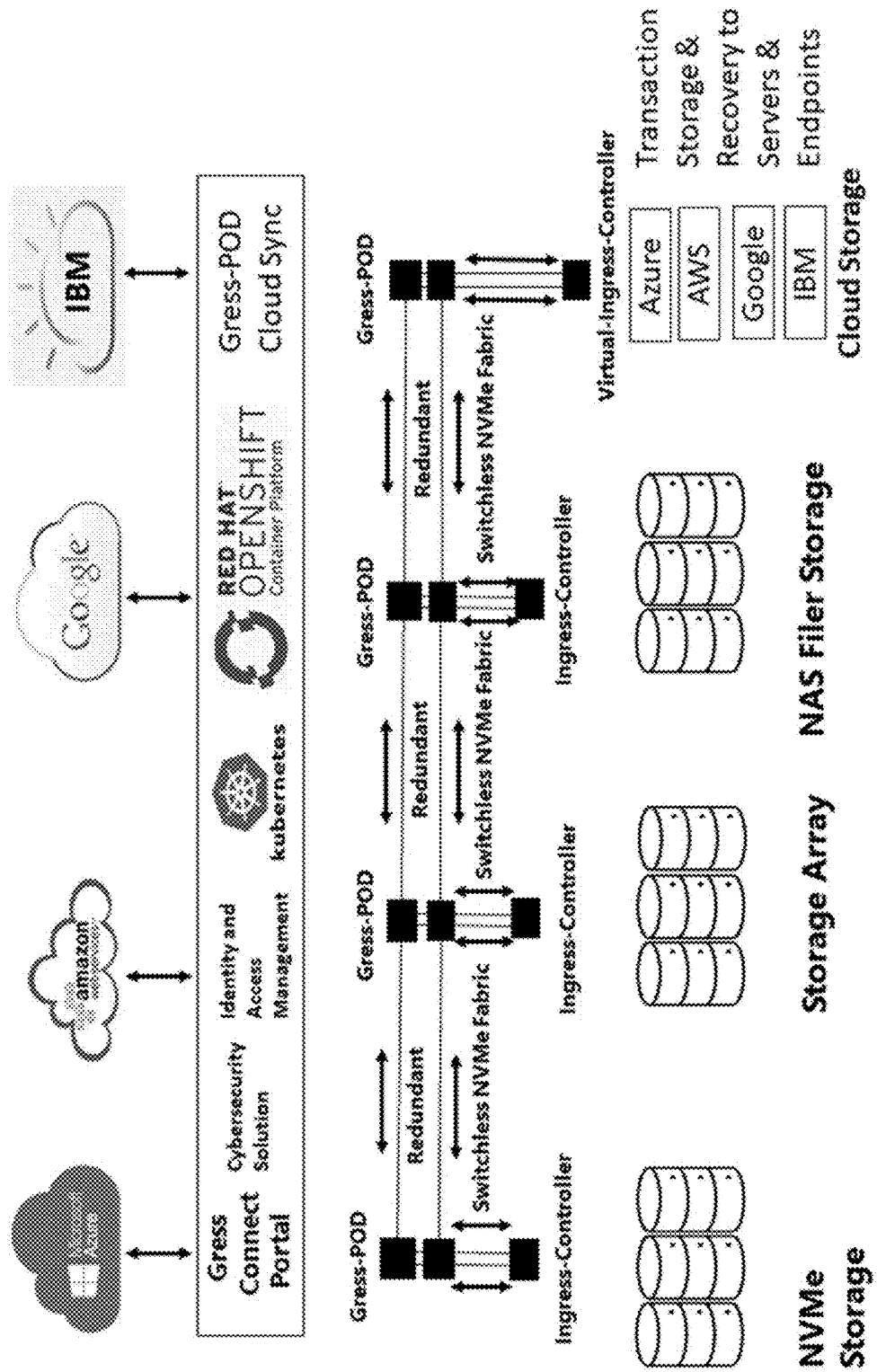
FIG. 3 shows the switchless cross connect architecture connecting different storage types, according to an exemplary embodiment of the present invention.

Disclosed is a network storage architecture for persistent storage in containerized applications, such as Kubernetes, having higher speeds and lower latencies. Disclosed is a switchless NVMe fabric channel cross connect architecture for NVMe SSDs or mixed storage. Referring to FIGS. 1 and 2 which shows the NVMe SSD storage connected to the switchless NVMe fabric channel cross connect architecture through ingress controllers to several POD. The disclosed switchless NVMe fabric channel cross connect architecture can provide of cashing at fiber channel grid connection points which can result in higher speed and nanoseconds latencies. The Caching with Tuning Opportunistic Dedupe, Dehydration & Tiering to Cloud Storage can provide improved performance. FIG. 3 shows the containerized applications such as identity and password malmanagement system, cybersecurity systems that can be executed in cloud servers and disclosed switchless NVMe fabric channel cross connect architecture that can connect to mixed storages including the NVMe storage, NAS filer storage, cloud storage, and like connected through Ingress controllers.

The switchless NVMe fabric channel cross connect architecture can provide for direct multichannel fiber channel cross connects with supporting connection grids in hyperconverged nodes, storage arrays, NAS storage, software defined storage, and storage array clusters. There can be separate storage connectivity between nodes. In one aspect, the number of nodes that can cross connected can be about 8 across racks in separate fault and upgrade domains. The hyperconverged storage technologies can provide each appliance as a node in a cluster. The hyper-converged storage technologies can provide greater control over storage provisioning in a virtual server environment. Direct NVMe cross connectivity can be provided across hyper converged servers reducing the latency between nodes as low as 2 microseconds.

In one aspect, the disclosed switchless NVMe cross connect architecture can provide direct array to array connectivity without a switch. The NVMe storage array clustering through cross connect connectivity between arrays using fiber. Cross connect across racks using fiber channel can be provided without a switch. In one case, 1 TB flash memory can be providing as cache for data throughput. Cross connect 512 GB cache to support high speeds across connects, as shown in FIG. 3. Disclosed switchless NVMe cross connect architecture can provide for storage array clustering by switchless fiber connection between storage arrays combined with huge cache memory across different nodes can result in higher speed and reduced latencies. All connectivity to the nodes can be provided through connected fiber cross connect channels, eliminating the switches. The disclosed network topology has an advantage that if there are 4 nodes cross connected and connection 2 dies, there would still be connectivity to all other nodes within the cluster that are directly tied to the primary fiber cross connect channel and grid. Connection 2 in the example can either have the connected node swapped out or NVMe Cross Connect Channel interconnects swapped out in there are problems or upgrades without affecting the Cluster. Disclosed NVMe Cross Connect Grids can contain all of the ports and fiber connections within node and to and from the Primary Cross Connect Channel. The Switchless Architecture to provide faster direct connectivity between NVMe Cross Connected. Additionally, Remote Direct Memory Access (RDMA) for cross connect connectivity can also provide to reduce processor utilization.

What is claimed is:

1. A system comprising:
a plurality of ports;
a plurality of storage arrays as nodes, the plurality of storage arrays comprises NVMe SSDs and NAS File storage;
a switchless cross connect fiber channel architecture connecting the nodes; and
a plurality of ingress-controllers configured to provide an interface between the plurality of storage arrays and the switchless cross connect fiber channel architecture, wherein the switchless cross connect fiber channel architecture is configured to provide direct multichannel fiber channel cross connects with supporting connection grids in hyperconverged nodes, the plurality of storage arrays, NAS File storage, software defined storage, and storage array clusters,
wherein the switchless cross connect fiber channel architecture is configured to provide caching at fiber channel-grid connection points.

2. The system according to claim 1, wherein the switchless cross connect fiber channel architecture is configured to provide direct array to array connectivity without any switches.

3. The system according to claim 1, wherein the plurality of storage arrays comprises cloud storage.

* * * * *